(12) United States Patent
Thakur et al.

(10) Patent No.: US 8,886,737 B1
(45) Date of Patent: Nov. 11, 2014

(54) IDENTIFYING PARTICULAR PARTIES

(75) Inventors: Kumar Mayur Thakur, West Orange, NJ (US); Sheng Zhang, Jersey City, NJ (US); Jeremy Hylton, Easton, PA (US)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 13/605,929

(22) Filed: Sep. 6, 2012

Related U.S. Application Data

(60) Provisional application No. 61/531,490, filed on Sep. 6, 2011.

(51) Int. Cl.
*G06F 15/16* (2006.01)

(52) U.S. Cl.
USPC ............ 709/206; 709/200; 709/224; 707/771

(58) Field of Classification Search
USPC ........... 709/200, 206, 207, 227, 224; 707/771
See application file for complete search history.

(56) References Cited

U.S. PATENT DOCUMENTS

| | | | |
|---|---|---|---|
| 8,266,154 B2 | 9/2012 | Guo et al. | |
| 8,713,143 B2 * | 4/2014 | Centola et al. | 709/223 |
| 8,768,313 B2 * | 7/2014 | Rodriguez | 455/414.1 |
| 2006/0041543 A1 * | 2/2006 | Achlioptas | 707/3 |
| 2008/0270615 A1 * | 10/2008 | Centola et al. | 709/228 |
| 2011/0208749 A1 | 8/2011 | Guo et al. | |
| 2011/0212717 A1 * | 9/2011 | Rhoads et al. | 455/420 |
| 2011/0246483 A1 * | 10/2011 | Darr et al. | 707/748 |
| 2012/0089681 A1 | 4/2012 | Chowdhury et al. | |
| 2012/0185383 A1 * | 7/2012 | Demark et al. | 705/40 |

* cited by examiner

*Primary Examiner* — El Hadji Sall
(74) *Attorney, Agent, or Firm* — Fish & Richardson P.C.

(57) ABSTRACT

A method includes, receiving social network information of a user. The received social network information represents social graph data of the user and social network interactions of the user. The method also includes determining one or more subjects from content of the social graph data of the user and the interactions of the user. The method also includes identifying an initial collection of one or more individuals prominent in the one or more subjects from one or more measures of potential prominence provided by social network information of the individuals. The method also includes enhancing the initial collection of one or more prominent individuals to include additional prominent individuals. The method also includes providing a list of selectable entries to the user that includes each of the identified and additional prominent individuals.

36 Claims, 7 Drawing Sheets

IDENTIFYING PARTICULAR PARTIES

CROSS-REFERENCE TO RELATED APPLICATIONS

This application claims priority to U.S. Provisional Application Ser. No. 61/531,490, filed on Sep. 6, 2011, entitled "Identifying Particular Parties."

BACKGROUND

The present disclosure relates to identifying parties (e.g., individuals), for example with particular knowledgeable in a social network.

Social networking services can provide a platform for individuals to focus on building and maintaining social relationships with others, who, for example share interests, activities, etc. To establish and maintain such connections with others, users can interact with these network-based services, e.g. over the Internet, by sending e-mail messages, posting text with a limited number of characters (e.g., instant messages, text-based posts with 140 or less characters), other types of correspondence (e.g., short videos), etc. Through these connections with other individuals, a user may form or join many social circles with others of similar characteristics, interests, etc. for exchanging ideas, sharing experiences, etc. to generally enrich their lives.

SUMMARY

Based upon social network information, e.g. a user's social graph that includes a collection of connections that represent formed relationships (e.g., to other users and resources), a list of knowledgeable individuals for various subjects (e.g., politics, sports, etc.) are identified, ranked and provided. Presented the list, the user can select one or more of the ranked individuals for expanding the membership of his or her social graph and for performing related activities (e.g., establish and maintain connections with each selected individual).

In one aspect, a method includes, receiving social network information of a user. The received social network information represents social graph data of the user and social network interactions of the user. The method also includes determining one or more subjects from content of the social graph data of the user and the interactions of the user. The method also includes identifying an initial collection of one or more individuals prominent in the one or more subjects from one or more measures of potential prominence provided by social network information of the individuals. The method also includes enhancing the initial collection of one or more prominent individuals to include additional prominent individuals. The method also includes providing a list of selectable entries to the user that includes each of the identified and additional prominent individuals.

Implementations may also include any or all of the following features. Enhancing the initial collection may include expanding the initial collection to include additional prominent individuals identified from one or more subjects related to the one or more subjects determined from the user. Enhancing the initial collection may include expanding the initial collection by measuring social network interactions of the prominent individuals with other individuals. Identifying the initial collection of one or more individuals prominent in the one or more subjects may include assigning a score to each individual based on accumulated social network information of the individual and ranking the individuals based upon the respectively assigned score. The measure of potential prominence may represent an accumulation of social network postings of the respective individual. The measure of potential prominence may represent the number of instances that a social network posting of the respective individual has been accessed. The measure of potential prominence may represent the number of social network users that view social network postings of the respective individual. The one or more related subjects may be determined from one or more terms that are commonly interchanged with one or more terms that represent the one or more subjects determined from the user. One or more weighting factors may be applied to the one or more related subjects based on the relationship to the one or more subjects determined from the user. Measuring the social network interactions may include measuring interactions of the prominent individuals and other prominent individuals included in the initial collection. Measuring the social network interactions may include measuring the appearances of the prominent individuals in social graph data of other potentially prominent individuals. Enhancing the initial collection may include adjusting scores assigned to the prominent individuals and adjusting the order of the prominent individuals in the initial collection from the adjusted scores.

In another aspect, an electronic system includes memory to store instructions that are executable. The electronic system also includes one or more processing devices to execute the instructions to perform operations that include receiving social network information of a user. The received social network information represents social graph data of the user and social network interactions of the user. Operations also include determining one or more subjects from content of the social graph data of the user and the interactions of the user. Operations also include identifying an initial collection of one or more individuals prominent in the one or more subjects from one or more measures of potential prominence provided by social network information of the individuals. Operations also include enhancing the initial collection of one or more prominent individuals to include additional prominent individuals. Operations also include providing a list of selectable entries to the user that includes each of the identified and additional prominent individuals.

Implementations may also include any or all of the following features. Enhancing the initial collection may include expanding the initial collection to include additional prominent individuals identified from one or more subjects related to the one or more subjects determined from the user. Enhancing the initial collection may include expanding the initial collection by measuring social network interactions of the prominent individuals with other individuals. Identifying the initial collection of one or more individuals prominent in the one or more subjects may include assigning a score to each individual based on accumulated social network information of the individual and ranking the individuals based upon the respectively assigned score. The measure of potential prominence may represent an accumulation of social network postings of the respective individual. The measure of potential prominence may represent the number of instances that a social network posting of the respective individual has been accessed. The measure of potential prominence may represent the number of social network users that view social network postings of the respective individual. The one or more related subjects may be determined from one or more terms that are commonly interchanged with one or more terms that represent the one or more subjects determined from the user. One or more weighting factors may be applied to the one or more related subjects based on the relationship to the one or more subjects determined from the user. Measuring the social network interactions may include measuring interactions of the prominent individuals and other prominent individuals included in the initial collection. Measuring the social network interactions may include measuring the appearances of the prominent individuals in social graph data of other potentially prominent individuals. Enhancing the initial collection may include adjusting scores assigned to the prominent individuals and adjusting the order of the prominent individuals in the initial collection from the adjusted scores.

In another aspect, one or more non-transitory machine-readable storage media storing instructions that are executed to perform operations that include operations that include receiving social network information of a user. The received social network information represents social graph data of the user and social network interactions of the user. Operations also include determining one or more subjects from content of the social graph data of the user and the interactions of the user. Operations also include identifying an initial collection of one or more individuals prominent in the one or more subjects from one or more measures of potential prominence provided by social network information of the individuals. Operations also include enhancing the initial collection of one or more prominent individuals to include additional prominent individuals. Operations also include providing a list of selectable entries to the user that includes each of the identified and additional prominent individuals.

Implementations may also include any or all of the following features. Enhancing the initial collection may include expanding the initial collection to include additional prominent individuals identified from one or more subjects related to the one or more subjects determined from the user. Enhancing the initial collection may include expanding the initial collection by measuring social network interactions of the prominent individuals with other individuals. Identifying the initial collection of one or more individuals prominent in the one or more subjects may include assigning a score to each individual based on accumulated social network information of the individual and ranking the individuals based upon the respectively assigned score. The measure of potential prominence may represent an accumulation of social network postings of the respective individual. The measure of potential prominence may represent the number of instances that a social network posting of the respective individual has been accessed. The measure of potential prominence may represent the number of social network users that view social network postings of the respective individual. The one or more related subjects may be determined from one or more terms that are commonly interchanged with one or more terms that represent the one or more subjects determined from the user. One or more weighting factors may be applied to the one or more related subjects based on the relationship to the one or more subjects determined from the user. Measuring the social network interactions may include measuring interactions of the prominent individuals and other prominent individuals included in the initial collection. Measuring the social network interactions may include measuring the appearances of the prominent individuals in social graph data of other potentially prominent individuals. Enhancing the initial collection may include adjusting scores assigned to the prominent individuals and adjusting the order of the prominent individuals in the initial collection from the adjusted scores.

Particular embodiments of the disclosed technologies can be implemented to realize one or more of the following advantages. Without distracting a user with prompts (e.g., from a user interface), and thereby improving user experience, a targeted list of prominent individuals (e.g., experts in an area of interest for the user) can be identified and presented to the user. Along with selecting one or more of the prominent individuals for inclusion in the user's social graph, others with similar interests can be identified for further expanding social graphs and improving the knowledge base of the user.

The details of one or more embodiments of the disclosed technologies are set forth in the accompanying drawings and the description below. Other features, aspects, and advantages of the disclosed technologies will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
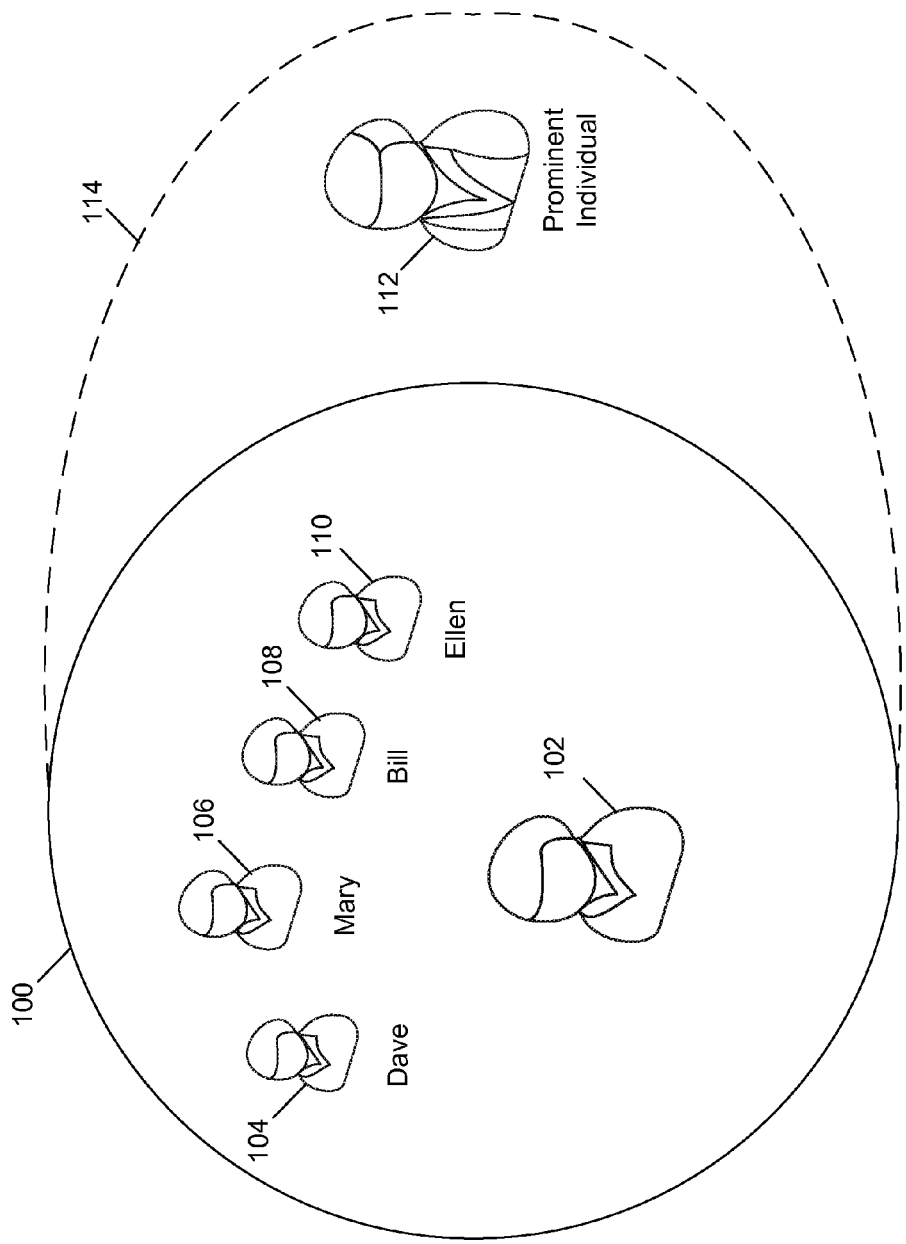
FIG. 1 illustrates expanding a social graph to include a prominent individual.

Referring to FIG. 1, a social graph is illustrated as being expanded to include a prominent person in a subject. In general a prominent individual can be considered one knowledgeable, well informed, etc. in one or more subjects, areas of study, etc. A graphical circle 100 represents a social graph of an individual user 102. By cultivating and maintaining relationships through various types of network-based interactions (e.g., sending e-mail messages, posting relatively short text passages, etc.), the user may establish one or more social circles of friends, colleagues, individuals that share common traits, points of view, etc. For demonstrative purposes, the social network of the user 102 (as represented by the circle 100) is illustrated as containing a relative few number of individuals (e.g., four individuals 104, 106, 108, 110, respectively named "Dave", "Mary", "Bill", and "Ellen"). Along sharing interests or other type of commonality with the individuals 104-110 included in user's social graph, other individuals or groups may also share these interests with the user 102. For example, user interests e.g. politics, types of sports, exploring technology, etc., may be shared by individuals external to the user's social graph. Further, individuals particularly knowledgeable in subjects of interest to the user 102 (and potentially the individuals 104-110 in the social graph) could also be outside, but capable of being brought into the user's social graph as a member. For example, one or more experts in a subject of interest to the user 102 (e.g., a prominent individual 112) could be identified and presented to the user for selection for inclusion in his or her social graph. As illustrated in the figure with dashed line 114, by selecting the prominent individual 112, the membership of the social graph is expanded along with the knowledge base of the user's social network. Further, by including the prominent individual 112, more individuals may be identified (e.g., from e-mail exchanges, message postings, etc.) for inclusion in the network to further expand the knowledge base that could enrich the lives of the user 102 along the membership of the social graph (e.g., Dave, Mary, Bill, Ellen, etc.).

One or more techniques may be implemented for identifying such experts and prominent individuals in subjects to which the user has an affinity. For example, rather than presenting one or more queries to the user for gathering information to identify such topics, information associated with the user's social graph could be used for such identifications. In some implementations, the social graph (or social graphs) of the user 102, interactions based on the social graph, content of interactions, etc. may be used for identifying these knowledgeable individuals. As such, the identification process may be executed without directly interacting with the user 102. As such, the amount of user interaction e.g., input related to submitting queries or to other direct information gathering techniques, can be reduced. Rather, determinations can be executed and simply presented to the user for selecting (or not selecting) the identified knowledgeable individuals. However, in some implementations, user input may be solicited prior to or during the identification process. For example, the user 102 may be directly asked to identify current subjects of interest, select or rank subjects of interest, etc. as determined from information gathered from the user's social network(s) (e.g., social graphs, social interactions, content of the interactions, etc.).

As used in this specification, a social graph can refer to a single social graph or multiple interconnected social graphs. Distinct social graphs can be generated for different types of connections a user has. For example, a user can be connected with chat contacts in one social graph, email contacts in a second social graph, and a connections from a particular social network in a third social graph. Each social graph can include edges to additional individuals or entities at higher degrees of separation from the user. For example, an email contact can have its own email contacts to others adding a degree of separation from the user (e.g., user→email contact→contact of email contact). These contacts can in turn have additional contacts at another degree of separation from the user. Similarly, a user's connection to someone in a particular social graph can then be used to identify additional connections based on that person's connections. The distinct social graphs can include edges connecting one or more social graph to one or more other social graphs.

Types of connections and social graphs can include, but are not limited to other users in which the user is in direct contact (e.g., user mail or chat contact, direct contacts on social sites) and users in which the user is in indirect contact (e.g., friends of friends, connections of users that have a direct connection to the user). In some implementations, the social graph includes content generated by individuals (e.g., blog posts, reviews) as connections to the user. The social graph can include connections within a single network or across multiple networks (separable or integrated).

Figure 2:
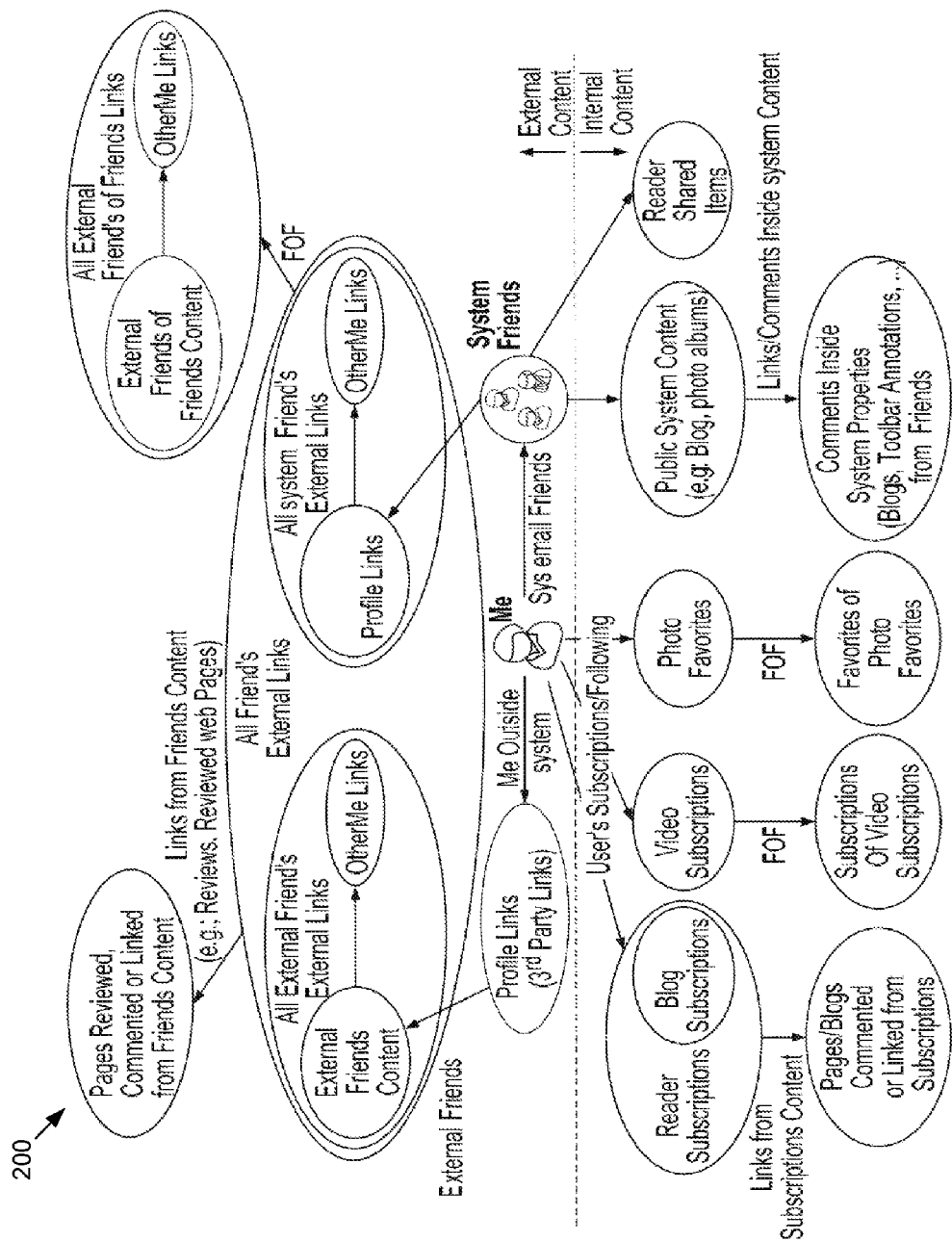
FIG. 2 is a diagram of example sources and social graph information.

FIG. 2 is a diagram 200 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 200 shows a user and the different connections possible to extend a user's social graph to people and content both within a system and across one or more external networks and shown at different degrees of separation. For example, a user can have a profile or contacts list that includes a set of identified friends, a set of links to external resources (e.g., web pages, images, video), and subscriptions to content of the system (e.g., a system that provides various content and applications including e-mail, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph is user set. Alternatively, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social graphing site) or type of interaction (e.g., endorsing or selecting items associated with friends). As interaction changes, the relationship of a particular contact in the social graph can also dynamically change. Thus, the social graph can be dynamic rather than static.

In some alternative implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

Figure 3:
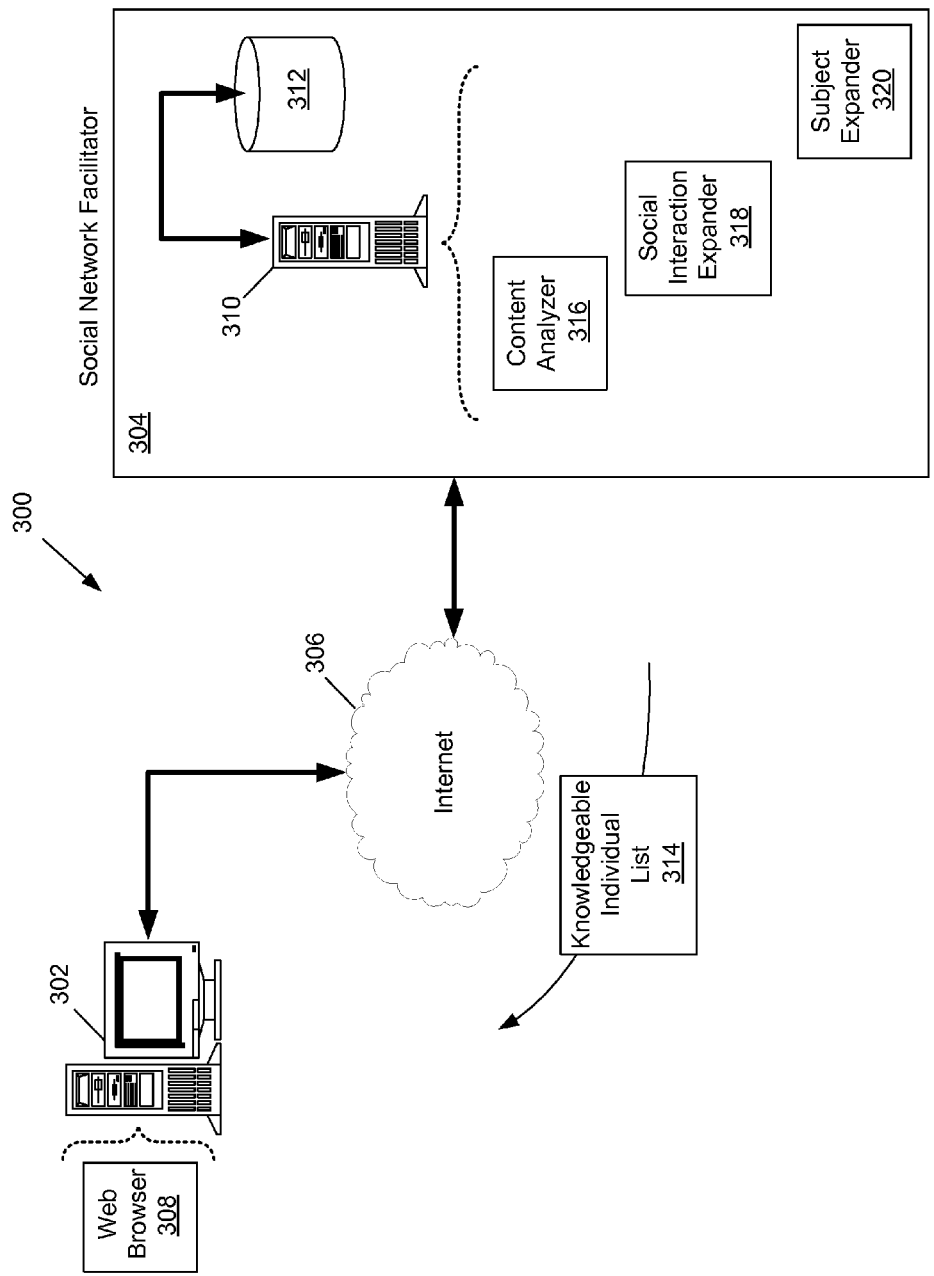
FIG. 3 is an example system for producing lists of prominent individuals and presenting the lists to a user.

Referring to FIG. 3, an example system for producing lists of knowledgeable individuals and presenting the lists to a user is shown. An example system 300 is illustrated for producing lists of knowledgeable individuals (in one or more subjects) for presenting to a user for review and selecting one or more of the individuals for inclusion in their respective networks. For this implementation, a user interacts with a computer system 302 although various types of computing devices may be used for such user interactions. For example, laptop computers, tablet computing devices, hand-held computing devices (e.g., smart cellular telephones, personal digital assistants (PDAs), etc.) may be utilized for user interactions. To establish, build and manage social networks, the computer system 302 is connected to a social network facilitator 304 via one or more networks (e.g., the Internet 306). In this example, the social network facilitator 304 can be considered as remotely located (compared to the location of the user computer system 202). However, in some implementations, a portion or all of the functionality of the social network facilitator 304 may be provided by the computer system 302 or a collection of computing devices (that may or may not be positioned at the same or similar locations).

In this implementation, a web browser 308 is executed by the computer system 302 to allow the user to interact with the social network facilitator 304 along with other types of network-based resources and service providers. Through the interactions with the vast amount of resources and service providers connected to the Internet 306, the user may establish one or more social graphs with other users and entities (e.g., by exchanging information via messages and postings). Once established, data that represents the user's social graph (or social graphs) may be provided to the social network facilitator 304 for various operations. For example, along with monitoring and storing a representation of the social graph(s), the social network facilitator 304 may process information associated with the social graph(s) to produce one or more lists of individuals knowledgeable in subjects of interest to the user. In this implementation, upon attaining information associated with the user's social graph(s) (e.g., by collecting the social graph information with or without direct interactions with the user), one or more computing devices (e.g., a computer system 310) associated with the social network facilitator 304 processes the information. Along with the collected information, which may be stored in one or more storage devices (e.g., a storage device 312), other data and types of data may be retrieved for use in the executed operations.

One or more techniques may be implemented for identifying one or more knowledge individuals in subjects of interest to the user. For example, a multiple stage processing technique may be implemented for producing a list 314 of prominent individuals that may be provided by the social network facilitator 304 to the computer system 302 (via the Internet 306). Once received, the list may be presented (by the web browser 308) and the user may select one or more identified individuals from the list for inclusion in the user's social graph (e.g., added to their social graph). As illustrated in the figure, the computer system 308 (located at the social network facilitator 304) includes three processes for identifying the prominent individuals, however, the functionality of the processes may be combined into one or two processes or distributed among more than three processes in some implementations. In general, the processes initially identify a collection of individuals and then enhance the collection (e.g., by adding, removing and/or reordering the individuals on the list). In this implementation, the computer system 308 executes a content analyzer 316, a social interaction expander 318 and a subject expander 320 for producing the list of knowledgeable individuals for providing to the computer system 302 for presenting to the user. In general, the content analyzer 316 analyzes messages, postings, etc. associated with a subject of interest to initially identify individuals that could be considered as being knowledgeable in the subject. Other types of content may also be used for identifying individuals, for example, one or more profiles may be used as sources of content for identifying individuals. One or more networks, network assets (e.g., websites, webpages, etc.), etc. may be used for identifying individuals. Once initially prepared, a list of individuals is analyzed by the social interaction expander 318 to potentially identify additional individuals and reorder the list based upon social interactions of the individuals identified by the content analyzer 316. Along with potentially expanding the list based upon social interactions, the subject expander 320 may expand the list of knowledgeable individuals based upon potentially related subjects to the subject of interest. For example, after identifying a list of individuals knowledgeable in the subject of politics, the list may be expanded based upon individuals identified as being knowledgeable in the subjects of polling and elections. Once the list is produced and refined by these three processes, and presented to the user (e.g., via the web browser 308), the user can determine whether or not to select one or more of the identified prominent individuals for inclusion in the user's social graph. For example, upon being selected and entered into an appropriate social graph, many types of social interactions may occur between the user and the selected individual. For example, the user may choose to follow postings of the selected individual on a social network service. Along with postings, e-mail messages, documents, along with other information associated with the selected knowledgeable person may be identified and provided to the user (e.g., via the Internet 306). As such, along with expanding his or her social graph to include one or more identified individuals, more information on subjects of interest may be provided without significant efforts being expended by the user.

Figure 4:
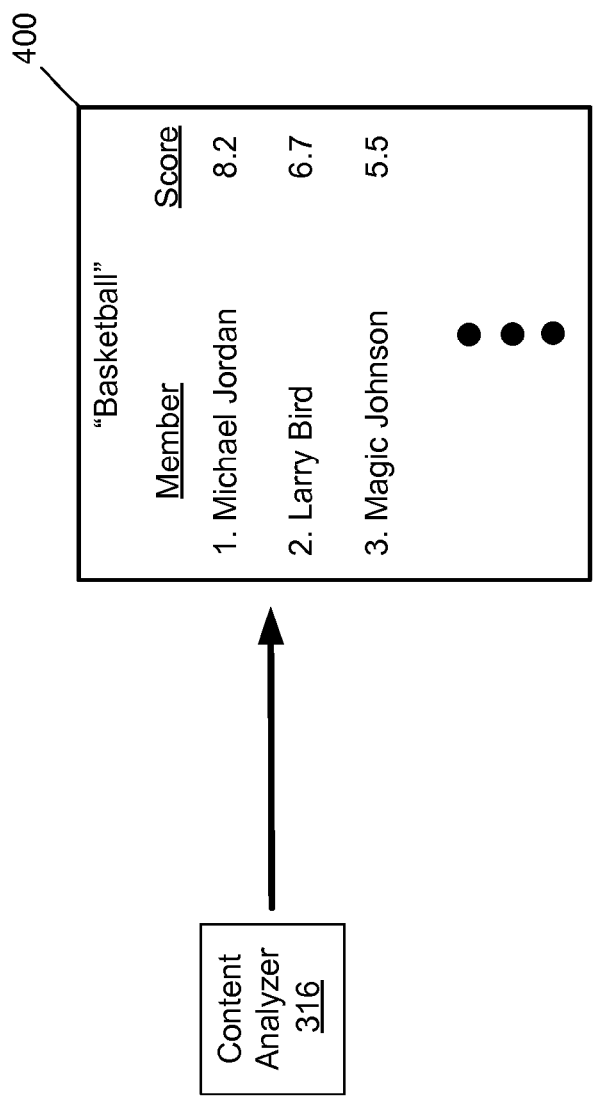
FIGS. 4-6 are diagrams of example processing stages for producing lists of prominent individuals.
Figure 5:
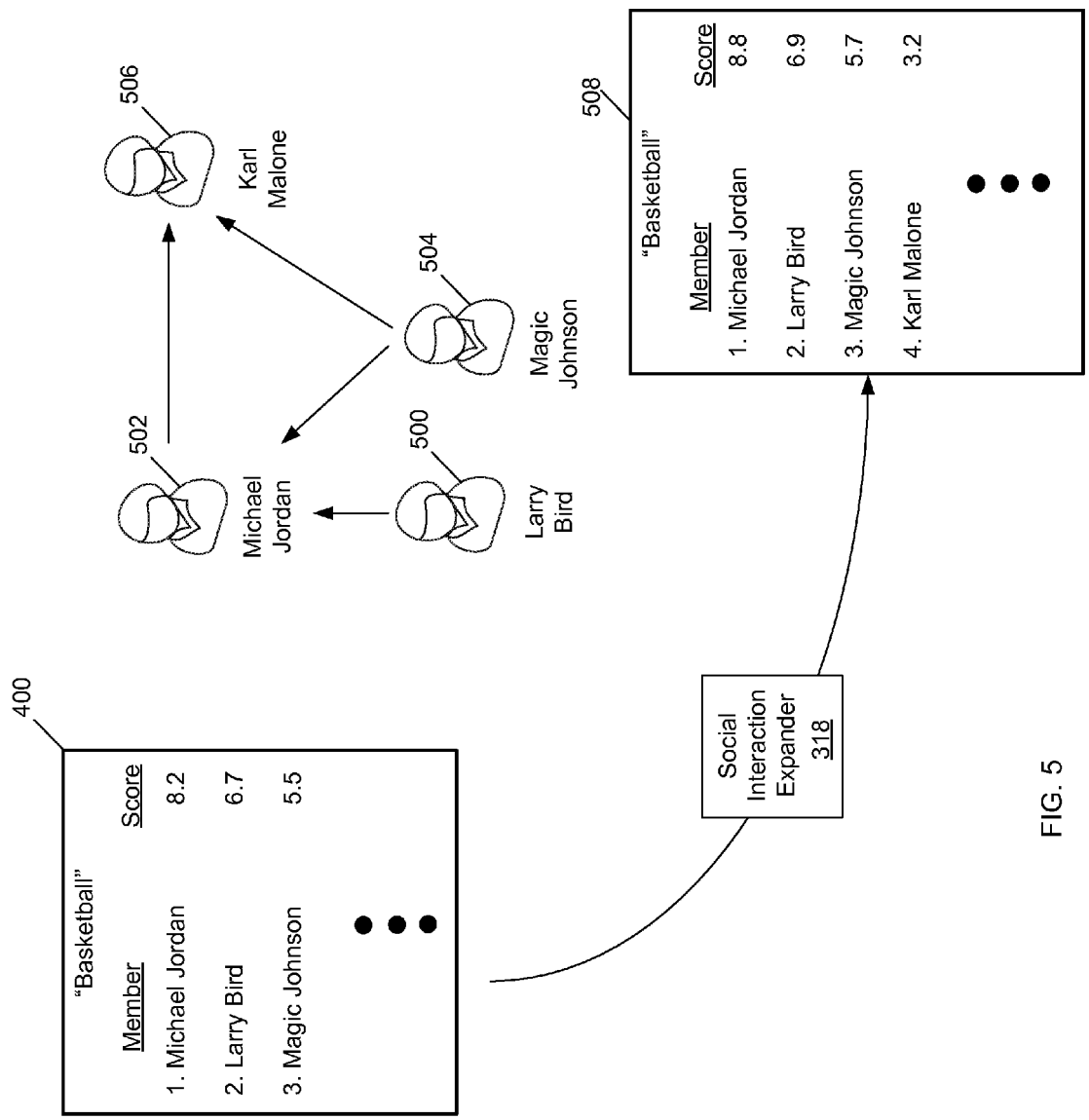
Figure 6:
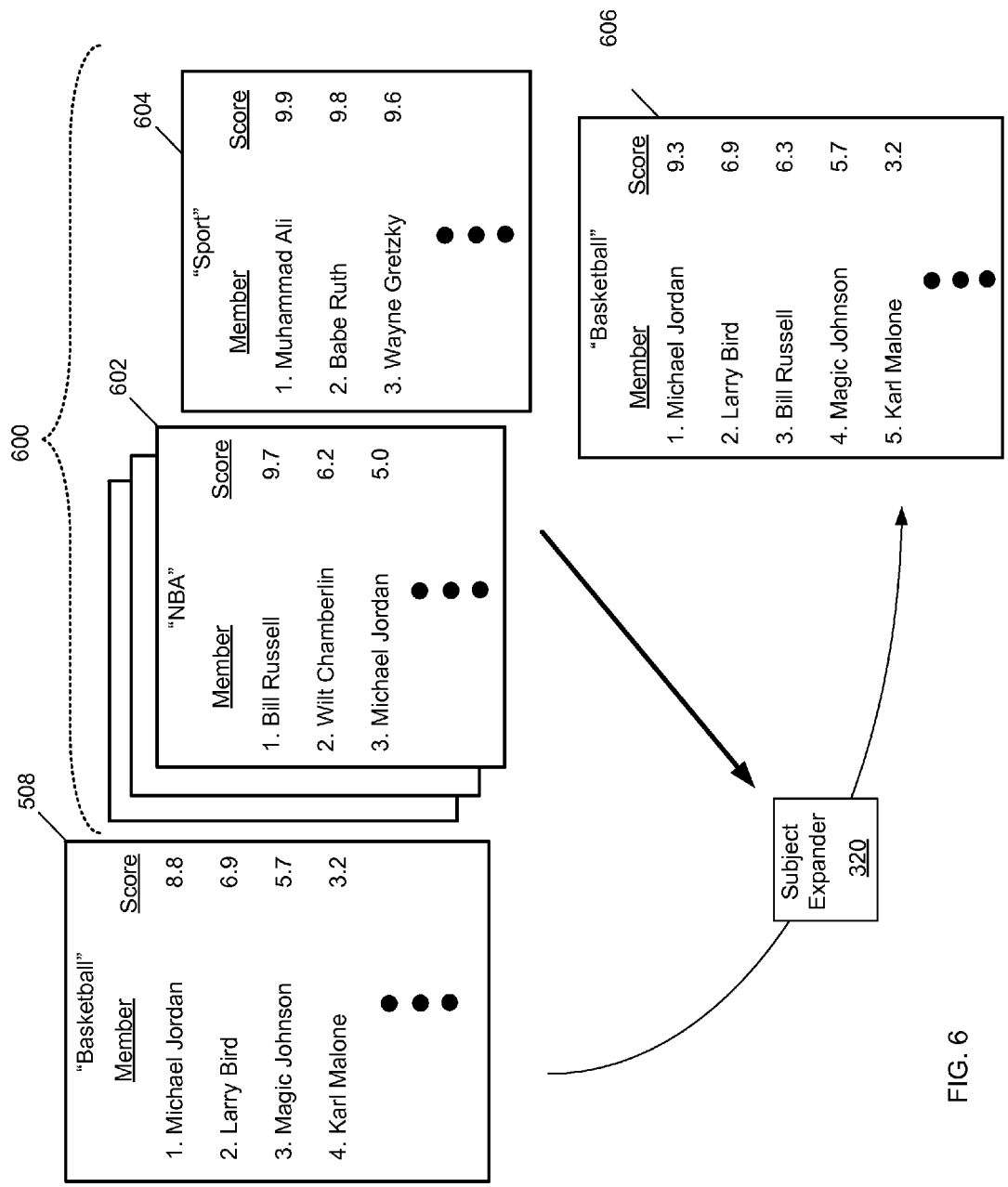

FIGS. 4-6 are diagrams of example processing stages for producing lists of knowledgeable individuals. Referring to FIG. 4 an example of an initial list of knowledgeable individuals for a particular subject as provided by the content analyzer 316 is presented. In this particular example, a list 400 includes individuals associated with the subject of "Basketball". Along with identifying the individuals (e.g., listing the name of each person), the list 400 also presents a score that has been assigned to each listed individual. By applying such scores, the individuals may be ranked such that individuals determined to be more prominent in the subject are positioned higher on the list than individuals determined not to be as prominent. In this particular example, the top three individuals included in the list 400 are well known basketball players with long and successful careers.

One or more techniques may be used for determining which individuals can be considered as being prominent in a subject. For example, social network information related to the subject of interest (e.g., basketball) can be analyzed for identifying the individuals. In some arrangements one or more measures may be developed to quantify the prominence of an individual. Social network postings, messages (e.g., e-mail messages), documents and other types of content may be analyzed for identifying individuals. For example, social network postings may be accumulated to provide a measure of potentially prominent individuals. Along with the count of postings or other types of representations of content associated with an individual, other social graph information may factor into identifying the individuals. For example, interactions with the content associated with an individual may be measured. Metrics e.g. the number of instances that a posting, message or document has been accessed, reviewed, shared with others, etc. can be used as a measure of popularity for a potentially prominent individual. Measured interactions may also include how the information associated with a potential individual is used by social network users (or other types of users). For example, metrics associated with flagging information as being interesting or useful (e.g., creating a bookmark for a document or adding a particular posting to a list of favorites, etc.) so that the information can be retrieved at a later time, presented to others, etc. Established connections between the potentially prominent individuals and social network users may also be used as a metric. For example, by accumulating the number of users that follow an individual (e.g., follow a person's microblog posts, etc.) may also provide a measure of an individual's prominence in a subject. From this collected information that can be considered as a measure of prominence, a score can be quantified and assigned to the individual. For example, various mathematical operations may be used to define a score based upon the collected measures. Additionally, weighing factors and other scaling techniques (e.g., translating the scored to a predefined range) may be used for defining scores. One or more thresholds or other filtering techniques may be used for removing identified individuals if their corresponding score is deemed below a predefined value (e.g., based upon the scores assigned to all of the identified individuals). In this illustrated example, each of individuals in the list 400 is assigned a score that ranges between 0.0 and 10.0. Once the scores are assigned and filter operations appropriately remove one or more individuals (e.g., based on a minimal acceptable score), other operations may be executed by the content analyzer 316 to prepare the list 400. For example, the remaining members of the list 400 may be ranked such that the user can easily identify the individuals considered more prominent (than others) in the subject. In this particular example, the score assignment and ranking has produced a list of prominent individuals for the subject of basketball, of which the top three are shown (e.g., Michael Jordan, Larry Bird and Magic Johnson). Along with defining the list of prominent individuals based upon content (e.g., message, postings, documents, etc.) associated with the individuals, additional information may be used identifying individuals. For example, social networking activities of the individuals themselves may be quantified and used to produce the list of prominent individuals.

Referring to FIG. 5, from the list 400 produced by the content analyzer 316, the social interaction expander 318 (e.g., also executed by the computer system 308 at the social network facilitator 304, shown in FIG. 3.) executes operations to adjust the list by taking into account the social network activities of the individuals identified in the list. For example, based upon these activities, the individuals included in the list 400 may be adjusted (e.g., individuals added, removed, etc.) along with the order that the individuals appear in the list. Various types of social network activities may be used by the social interaction expander 318 to adjust the list. For example, interactions of prominent individuals included in the list with other prominent individuals may be used for list adjustments. In one instance, activities of the prominent individuals included in the list 400 may be analyzed to determine if the activities are associated with other individuals included in the list. For example, the social graph of one individual (e.g., Larry Bird, illustrated with representation 500) may show a connection with another individual (e.g., Michael Jordan, illustrated with representation 502) included in the list 400. Following postings (e.g., via microblog posts accounts), messages, documents, etc. may illustrate the one individual (e.g., Larry Bird) following the other individual. In a similar manner, another individual included in the list 400 (e.g., Magic Johnson, illustrated with representation 504) may be connected to the same individual (e.g., Michael Jordan), for example, as provided by the social graph of this individual. As such, since the individual (e.g., Michael Jordan) is associated with social network activities of others, this individual's score may be adjusted to account the connections. For example, the score assigned to the individual (e.g., Michael Jordan) may be increased to reflect that the individual is more prominent due to his or her appearance in the social graphs of other individuals. In this particular example, an updated list 508 is produced by the social interaction expander 318 within which the score assigned to the prominent individual (e.g., Michael Jordan) has been increased (e.g., from a value of 8.2 to 8.8). While the position (e.g., first position) for this individual remains unchanged in the list 508 (compared to the position in the list 400), the social interaction expander 318 is also capable of adjusting positions in the list as needed (e.g., based upon the updated scores assigned to the individuals). Scores of the individuals (e.g., Larry Bird and Magic Johnson) that include the identified individuals (e.g., Michael Jordan) may be similarly adjusted. For example, their scores may be increased, although by a lesser amount (compared to the identified individual). As shown in the figure, the scores for Larry Bird and Magic Johnson are increased by an amount of 0.2 compared to the amount of 0.6 increased to the score assigned to Michael Jordan.

Other types of social network activities may be used by the social interaction expander 318 for adjusting the list 400 produced by the content analyzer 316. For example, additional prominent individuals may be identified based upon the social graphs of previously identified prominent individuals. As illustrated in the figure, the social graphs of two prominent individuals included in list 400 (e.g., Michael Jordan, shown by representation 502, and, Magic Johnson, shown by representation 504) include another individual (e.g., Karl Malone, shown with representation 506) who is not included in the list 400. For example, the social graphs for these previously identified individuals may include connections with this individual. Based upon the information provided by the social graphs of the individuals included in the list 400, the social interaction expander 318 may identify additional individuals as prominent individuals and include these newly identified individuals in the updated list 508. Prior to inserting the individual(s) into the list 508, additional operations may be executed by the social interaction expander 318. For example, a score may be calculated and assigned to each individual to be inserted (e.g., as determined by the operations of the content analyzer 316). Further, filtering operations may be executed to determine if the assigned score has an appropriate value (e.g., based upon a threshold) prior to adding the individual to the updated list 508. In this particular example, a score is calculated (e.g., by executing the operations of the content analyzer 316) and based upon the score the individual (e.g., Karl Malone, score 3.2) is added to the updated list 508 along with reordering the previously identified individuals as needed (e.g., based upon the assigned scores). As such, the individuals identified as prominent in a particular subject may be expanded or contracted based upon the social networking activities of the identified individuals. Similar to adjusting the list of prominent individuals based upon the identified individuals themselves, other information may be used for list adjustments. For example, the list may be refined based upon the particular subject to which prominent individuals are being identified.

Referring to FIG. 6, the updated list of prominent individuals can be further expanded based upon the subject for which the list is produced. For example, individuals associated with related subjects may be identified and potentially added to the list of prominent individuals. In some implementations, words, phrases, etc. with meanings that are nearly or exactly equivalent to the previously identified subject (e.g., synonyms) may be used for identifying individuals. One or more techniques may be implemented for identify such related subjects, for example, operations of the subject expander 320 may be executed to identify the related subjects. For example, predefined subject relationships and well known associations among subjects may be used for performing such subject identifications. In some instances, commonly interchanged terms may be used for identifying related subjects. For example, often the use of the term "basketball" is synonymous with the subject of "professional basketball" or the "national basketball association" or "NBA". As such, the subject expander 320 may identify the term "NBA" as being related to the term "basketball" and correspondingly attain (e.g., produce, retrieve from the storage device 312 at the social network facilitator 304, shown in FIG. 3) a list of prominent individuals associated with that related subject. As illustrated in the figure, executed operations of the subject expander 320 identify a collection 600 of prominent individual lists for subjects related to the subject of "basketball". In this example, the content of two lists included in the collection 600 is illustrated. Similar to the updated list provided by the social interaction expander 318, a list 602 associated with the term "NBA" includes a listing of prominent individuals and corresponding scores for each of the individuals. In a list 604, identified individuals (along with scores) are provided for another related term, "Sport", also determined by the subject expander 320 to be related to the subject of "basketball". As such, the membership of prominent individuals included in the updated list 508 may be further adjusted based upon the individuals identified as being associated with the other subjects of the collection 600.

Along with determining the associated subjects, the subject expander 320 determines which individuals identified as prominent in these related subjects should be added to the updated list 508. Since some of the relationships between these associated subjects (e.g., "NBA", "Sport", etc.) and the subject of the list 508 (e.g., "Basketball") may be different one or more techniques may be used to factor these differences. For example, different weighting factors may be applied to the associated subjects based upon the relationships. In some implementations, subjects whose relation is considered close (e.g., "Basketball" and "NBA") may be assigned a weighting factor that boosts the contents of the list of the associated subject (e.g., "NBA"). For subject relationships that can be considered more tangential, e.g. between the subject of "Basketball" and "Sport" a weighting factor may be assigned to content that provides less of a boost. In other implementations, content of subjects considered to be more tangential may be boosted by a weighting factor if commonly shared by both subjects (e.g., one or more individuals identified as being prominent appears on the lists for both subjects).

Once related subjects have been identified, the subject expander 320 may use list content of these subjects to further refine the updated list 508 provided by the social interaction expander 318. In some implementations, individuals identified as being prominent in the associated subjects may be added to the updated list 508. To make this determination, the subject expander 320 may execute a series of operations, for example, scores assigned to individuals of the associated subjects may be reviewed to determine if membership in the updated list 508 is warranted. In one instance, membership in the updated list 508 and one or more of the associated lists (e.g., list 602, 604, etc.) may be favorably viewed and scores may be boosted (e.g., by applying a weighting factor). As illustrated in the figure, one member (i.e., Michael Jordan) of the updated list 508 is also present on the list 602 associated with the related subject "NBA". Due to appearing on both lists, the score assigned to the member is boosted prior to being placed on a further updated list 606 by the subject expander 320 (e.g., the score assigned to the member "Michael Jordan" is increased from 8.8 to 9.3). Taking into account the scores assigned to the list members in the related subjects, the subject expander 320 may also determine is one or more members from these lists (e.g., list 602 and 604) should be inserted into the updated list 508. Along with the assigned score, one or more weighting factors assigned to the related subjects may factor in determining if prominent individuals of related subjects should be included. As illustrated in the figure, after appropriately weighting the assigned scores in the list 602 of the related subject "NBA", only one member (i.e., "Bill Russell") is identified as having a score value (i.e., 6.3) large enough to be added to the membership of the updated list 508. Similar operations are also executed on the membership and correspondingly assigned scores of the list 604 associated with the related subject "Sport". While each member of the list 604 has significant score values, the subject expander 320 considers the subject "Sport" to be tangential to the subject "Basketball" of the updated list 508. As such, the subject expander 320 appropriately weights the scores of the list 604 to values that are below a threshold for being included in the further updated list 606. So along with boosting the scores of some members of the updated list 508 based upon their appearance in lists of related subjects, the subject expander 320 also applies appropriate weights to the membership scores of related subjects identified by the subject expander.

As the further updated list 606 is being prepared, the subject expander 320 may execute additional operations, for example, the membership order may be adjusted based upon the scores of the newly added members. Additionally, based upon one or more rules, one or more members may be removed from the list. For example, rules may be applied such that membership totals are held to a predefined amount. As such, based upon the introduction of one or more new members, some members may need to be removed. In this illustrated example, one newly added member (e.g., Bill Russell) is shown inserted into the third position on the further updated list 606 based upon the weighted score. Correspondingly, other members of the updated list (e.g., Magic Johnson and Karl Malone) each drop one position in the further updated list. Upon being completed, the further updated list 606 may be provided to a user, for example, by presenting the list on the display of the computer system 302 through the web browser 308 (as shown in FIG. 3). Provided a listing of prominent individuals in a subject of interest, the user may select one or more individuals from the list for various social networking activities e.g. following the individuals on a social networking service, directly contacting the individuals (e.g., with a posting or an e-mail message) or interact with the individuals by one or more other techniques. In some implementations, the user may decide add one or more of the selected prominent individuals to their social graph.

Figure 7:
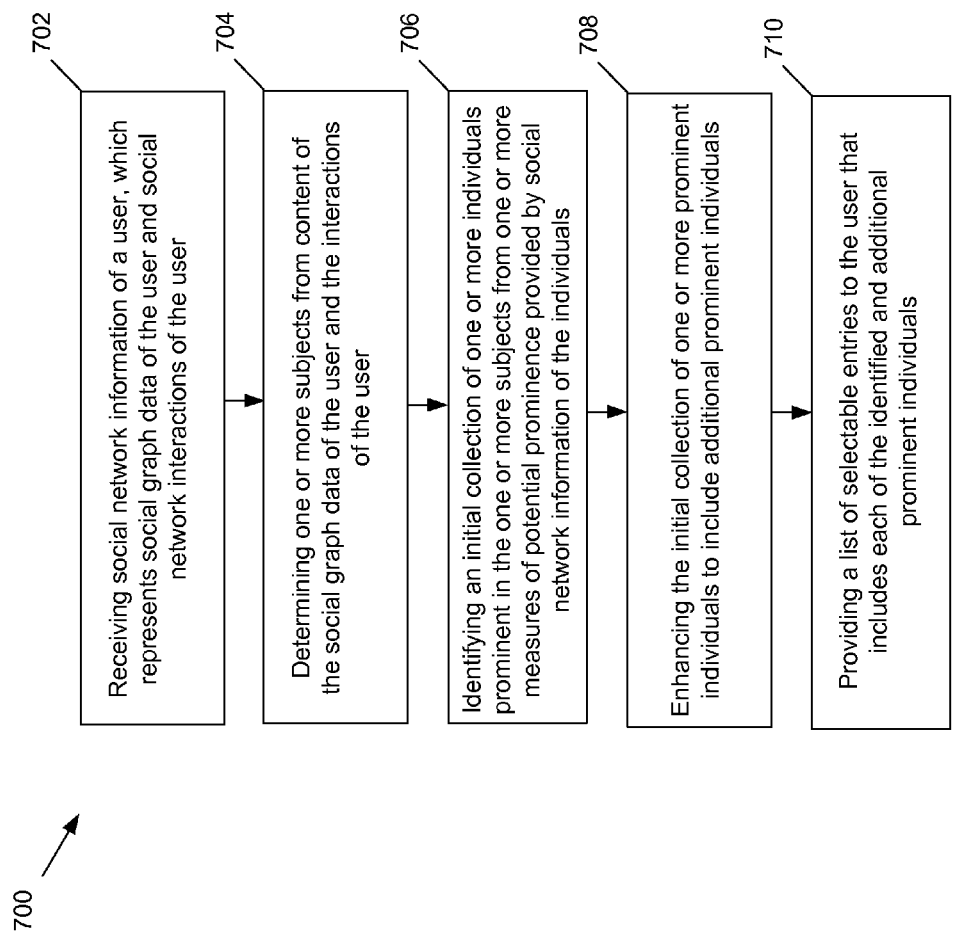
FIG. 7 is a flowchart of example operations for producing a list of prominent individuals.

FIG. 7 is a flowchart of example operations for producing and presenting a list of knowledgeable individuals. A flowchart 700 represents operations of one or more computing devices (e.g., the computer system 308, shown in FIG. 3) to provide a list of prominent individuals associated with a subject. For example, the operations represented in the flowchart 700 may represent operations executed by the content analyzer 314, the social interaction expander 316 and the subject expander 318 (each also shown in FIG. 3). Such operations are typically executed by components (e.g., general processors, specialized processors, etc.) included in a single computing device (e.g., the computer system 308), however, operations may be executed by multiple computing devices. Along with being executed at a single site (e.g., at the social network facilitator 304), operation execution may be distributed among two or more locations.

Operations may include receiving 702 social network information of a user, which represents social graph data of the user and social network interactions of the user. For example, the social graph data may include a social graph of the user, data that represents content included in the social graph, etc., and interactions of the user may represent user interactions with one or more social graphs. Operations may also include determining 704 one or more subjects from content of the social graph data of the user and the interactions of the user. For example, based upon content of the user's social graph and user input (e.g., one or more queries), one or more subjects that resonant with the user may be determined. Operations may also include identifying 706 an initial collection of one or more individuals prominent in the one or more subjects from one or more measures of potential prominence provided by social network information of the individuals. For example, postings that involve the determined subject or subjects, the number of instances that the postings are accessed by others, etc., may be used to develop numerical quantities that reflect the potential prominence of the individual that authored the postings. Based upon the quantified measure or measures, individuals may be entered as members of an initial collection of prominent individuals. Operations may also include enhancing 708 the initial collection of one or more prominent individuals to include additional prominent individuals. For example, the initial collection may be expanded to include additional individuals by measuring social network interactions of the identified prominent individuals with these additional individuals. The initial collection may also be expanded to include additional prominent individuals identified from one or more subjects related to the subject or subjects determined from the user. Operations may also include providing 710 a list of selectable entries to the user that includes each of the identified and additional prominent individuals. For example, a list of selectable entries may be provided (to a user device) that includes each of the prominent individuals for selection and inclusion in the social graph of the user.

Embodiments of the disclosed technologies and all of the functional operations described in this specification can be implemented in digital electronic circuitry, or in computer software, firmware, or hardware, including the structures disclosed in this specification and their structural equivalents, or in combinations of one or more of them. Embodiments of the disclosed technologies can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, which is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the disclosed technologies can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the disclosed technologies can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the disclosed technologies, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosed technologies or of what may be claimed, but rather as descriptions of features specific to particular embodiments of the disclosed technologies. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

For situations in which the systems and techniques discussed herein collect personal information about users, the users may be provided with an opportunity to enable/not enable of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

Thus, particular embodiments of the disclosed technologies have been described. Other embodiments are within the scope of the following claims. For example, the actions recited in the claims can be performed in a different order and still achieve desirable results.

What is claimed is:

1. A method, comprising:
   receiving social network information of a user, wherein the received social network information represents social graph data of the user and social network interactions of the user;
   determining one or more subjects from content of the social graph data of the user and the interactions of the user;
   identifying an initial collection of one or more individuals prominent in the one or more subjects from one or more measures of potential prominence provided by social network information of the individuals;
   enhancing the initial collection of one or more prominent individuals to include additional prominent individuals; and
   providing a list of selectable entries to the user that includes each of the identified and additional prominent individuals.

2. The method of claim 1, wherein enhancing the initial collection includes expanding the initial collection to include additional prominent individuals identified from one or more subjects related to the one or more subjects determined from the user.

3. The method of claim 1, wherein enhancing the initial collection includes expanding the initial collection by measuring social network interactions of the prominent individuals with other individuals.

4. The method of claim 1, wherein identifying the initial collection of one or more individuals prominent in the one or more subjects includes assigning a score to each individual based on accumulated social network information of the individual and ranking the individuals based upon the respectively assigned score.

5. The method of claim 1, wherein the measure of potential prominence represents an accumulation of social network postings of the respective individual.

6. The method of claim 1, wherein the measure of potential prominence represents the number of instances that a social network posting of the respective individual has been accessed.

7. The method of claim 1, wherein the measure of potential prominence represents the number of social network users that view social network postings of the respective individual.

8. The method of claim 2, wherein the one or more related subjects are determined from one or more terms that are commonly interchanged with one or more terms that represent the one or more subjects determined from the user.

9. The method of claim 2, wherein one or more weighting factors are applied to the one or more related subjects based on the relationship to the one or more subjects determined from the user.

10. The method of claim 3, wherein measuring the social network interactions includes measuring interactions of the prominent individuals and other prominent individuals included in the initial collection.

11. The method of claim 3, wherein measuring the social network interactions includes measuring the appearances of the prominent individuals in social graph data of other potentially prominent individuals.

12. The method of claim 3, wherein enhancing the initial collection includes adjusting scores assigned to the prominent individuals and adjusting the order of the prominent individuals in the initial collection from the adjusted scores.

13. An electronic system comprising:
   memory to store instructions that are executable; and
   one or more processing devices to execute the instructions to perform operations comprising:
      receiving social network information of a user, wherein the received social network information represents social graph data of the user and social network interactions of the user;
      determining one or more subjects from content of the social graph data of the user and the interactions of the user;
      identifying an initial collection of one or more individuals prominent in the one or more subjects from one or more measures of potential prominence provided by social network information of the individuals;
      enhancing the initial collection of one or more prominent individuals to include additional prominent individuals; and providing a list of selectable entries to the user that includes each of the identified and additional prominent individuals.

14. The electronic system of claim 13, wherein enhancing the initial collection includes expanding the initial collection to include additional prominent individuals identified from one or more subjects related to the one or more subjects determined from the user.

15. The electronic system of claim 13, wherein enhancing the initial collection includes expanding the initial collection by measuring social network interactions of the prominent individuals with other individuals.

16. The electronic system of claim 13, identifying the initial collection of one or more individuals prominent in the one or more subjects includes assigning a score to each individual based on accumulated social network information of the individual and ranking the individuals based upon the respectively assigned score.

17. The electronic system of claim 13, the measure of potential prominence represents an accumulation of social network postings of the respective individual.

18. The electronic system of claim 13, the measure of potential prominence represents the number of instances that a social network posting of the respective individual has been accessed.

19. The electronic system of claim 13, the measure of potential prominence represents the number of social network users that view social network postings of the respective individual.

20. The electronic system of claim 14, wherein the one or more related subjects are determined from one or more terms that are commonly interchanged with one or more terms that represent the one or more subjects determined from the user.

21. The electronic system of claim 14, wherein one or more weighting factors are applied to the one or more related subjects based on the relationship to the one or more subjects determined from the user.

22. The electronic system of claim 15, measuring the social network interactions includes measuring interactions of the prominent individuals and other prominent individuals included in the initial collection.

23. The electronic system of claim 15, wherein measuring the social network interactions includes measuring the appearances of the prominent individuals in social graph data of other potentially prominent individuals.

24. The electronic system of claim 15, wherein enhancing the initial collection includes adjusting scores assigned to the prominent individuals and adjusting the order of the prominent individuals in the initial collection from the adjusted scores.

25. One or more non-transitory machine-readable storage media storing instructions that are executed to perform operations comprising:
  receiving social network information of a user, wherein the received social network information represents social graph data of the user and social network interactions of the user;
  determining one or more subjects from content of the social graph data of the user and the interactions of the user;
  identifying an initial collection of one or more individuals prominent in the one or more subjects from one or more measures of potential prominence provided by social network information of the individuals;
  enhancing the initial collection of one or more prominent individuals to include additional prominent individuals; and
  providing a list of selectable entries to the user that includes each of the identified and additional prominent individuals.

26. The machine-readable storage media of claim 25, wherein enhancing the initial collection includes expanding the initial collection to include additional prominent individuals identified from one or more subjects related to the one or more subjects determined from the user.

27. The machine-readable storage media of claim 25, wherein enhancing the initial collection includes expanding the initial collection by measuring social network interactions of the prominent individuals with other individuals.

28. The machine-readable storage media of claim 25, identifying the initial collection of one or more individuals prominent in the one or more subjects includes assigning a score to each individual based on accumulated social network information of the individual and ranking the individuals based upon the respectively assigned score.

29. The machine-readable storage media of claim 25, wherein the measure of potential prominence represents an accumulation of social network postings of the respective individual.

30. The machine-readable storage media of claim 25, wherein the measure of potential prominence represents the number of instances that a social network posting of the respective individual has been accessed.

31. The machine-readable storage media of claim 25, wherein the measure of potential prominence represents the number of social network users that view social network postings of the respective individual.

32. The machine-readable storage media of claim 26, wherein the one or more related subjects are determined from one or more terms that are commonly interchanged with one or more terms that represent the one or more subjects determined from the user.

33. The machine-readable storage media of claim 26, wherein one or more weighting factors are applied to the one or more related subjects based on the relationship to the one or more subjects determined from the user.

34. The machine-readable storage media of claim 27, wherein measuring the social network interactions includes measuring interactions of the prominent individuals and other prominent individuals included in the initial collection.

35. The machine-readable storage media of claim 27, wherein measuring the social network interactions includes measuring the appearances of the prominent individuals in social graph data of other potentially prominent individuals.

36. The machine-readable storage media of claim 27, wherein enhancing the initial collection includes adjusting scores assigned to the prominent individuals and adjusting the order of the prominent individuals in the initial collection from the adjusted scores.

* * * * *